United States Patent Office 3,629,385
Patented Dec. 21, 1971

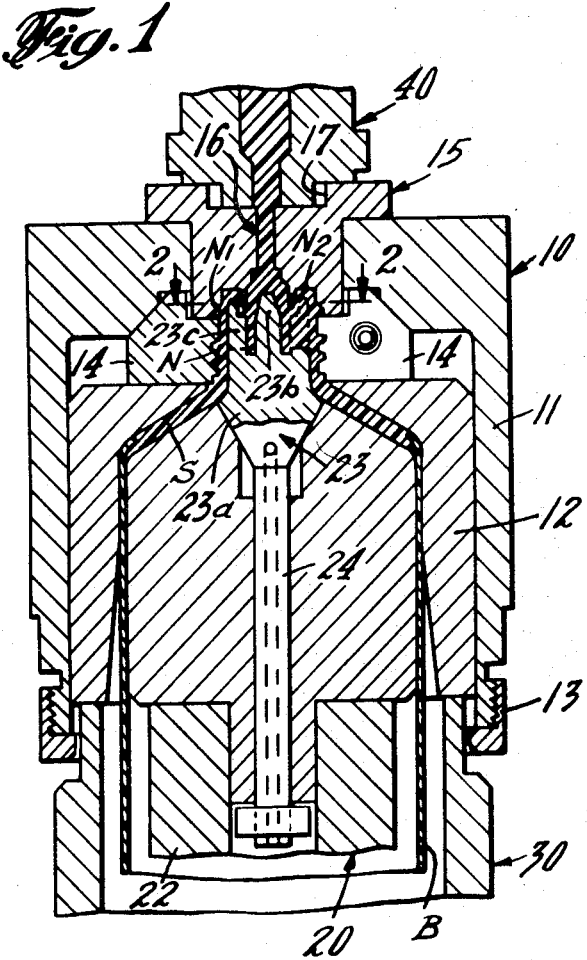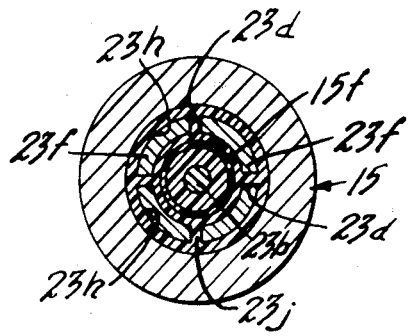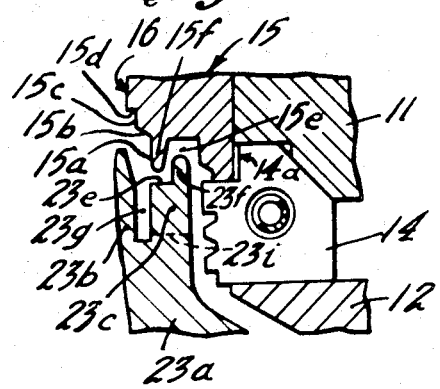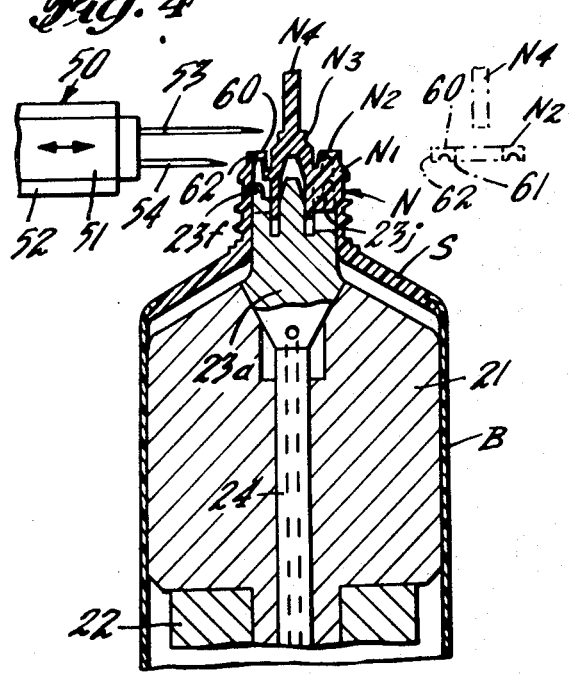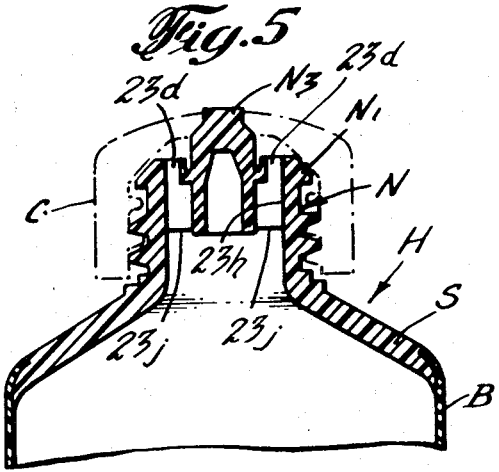

3,629,385
METHOD OF FORMING A CONTAINER NECK
Charles Arthur Badavas, Allendale, N.J., Raymond William Landry, Hudson, Mass., and John William Piltzecker, Easton, Pa., assignors to American Can Company, New York, N.Y.
Continuation-in-part of application Ser. No. 576,420, Aug. 31, 1966. This application Oct. 27, 1969, Ser. No. 869,675
Int. Cl. B29c 17/10
U.S. Cl. 264—154
6 Claims

ABSTRACT OF THE DISCLOSURE

The manufacture of the structurally complex molded neck element of a "center lock" captive closure, which neck element comprises a sealing plug centrally suspended within a hollow body on spaced radial webs, thereby to define dispensing apertures between the plug and body. The forming procedure includes the injection molding of the neck element including an inverted annular member surrounding the plug and bridging the annular space between the plug and body, and thereafter severing and entirely removing the annular member to open and form elongated dispensing apertures between the webs and surrounding the plug in a precisely shaped neck element.

REFERENCE TO RELATED APPLICATION

This application is a continuation-in-part of our copending application of Charles Arthur Badavas et al., Ser. No. 576,420, filed Aug. 31, 1966, for Method of and Apparatus for Forming a Container Neck, now abandoned.

BACKGROUND OF THE INVENTION

Center lock closures are well known in the art and presently enjoy extensive use with plastic squeeze containers, such as bottles and collapsible tubes, for dispensing a wide variety of viscous products. A closure of this type is described in U.S. Pat. No. 3,263,851 to A. K. Grimsley. The neck element of the closure is a plastic molding and may be formed integrally with the container, such as the collapsible tube in the aforementioned U.S. Pat. 3,263,851, or it may be molded as a separate element which is subsequently connected to the container in another manner.

As is typical of the "center lock" closure construction, the neck element includes a hollow body and a centrally disposed sealing plug suspended within the body on spaced radial members or webs, the spaces between which provide the apertures through which the contents of the containers are dispensed. Although simple in operation, completely contoured closures of this type, and particularly the neck element, present a difficult molding problem. Tight dimensional control and accurate finish are essential, and yet the mold tooling must be simple in construction and operation to enable economical production.

BRIEF SUMMARY OF THE INVENTION

The present invention provides an improved and simplified method of and apparatus for forming complexly contoured center lock captive closure neck elements, while yet achieving dimensional control and accurate finish along with relatively simple tooling.

To this end, the molding apparatus is of the injection-mold type to obtain precision forming, but avoids the necessity for expensive and often unreliable "matched set" tools to form the plurality of dispensing apertures in the contoured neck element. Rather, an annular top wall portion is integrally injection formed with the neck element and in concentric relation to the center plug and the body portion of the neck element. Thereafter, removal of the entire one-piece top wall, preferably in a single severing step, effects final formation and opening of elongated dispensing passages in the largely accurately finished neck element, thereby eliminating or minimizing subsequent finishing operations.

DESCRIPTION OF THE DRAWINGS

These and other features and advantages of this invention will be apparent in the following description which, together with the accompanying drawings and claims, disclose a preferred embodiment thereof.

Referring to the drawings:

FIG. 1 is a sectional view of a preferred or exemplary form of the mold tooling used in the practice of this invention;

FIG. 2 is a sectional view, enlarged to approximately double size, taken substantially along line 2—2 of FIG. 1;

FIG. 3 is an enlarged fragmentary sectional view, showing in greater detail a portion of the tooling illustrated in FIG. 1, before the molding material is introduced in the mold cavity;

FIG. 4 is a view of the molding after removal of the female die illustrating the final trimming operation; and, FIG. 5 is a sectional view of the finished molding.

DETAILED DESCRIPTION OF A PREFERRED EMBODIMENT OF THE INVENTION

The method and apparatus of the present invention pertain to the manufacture of a headpiece for a collapsible squeeze tube of the type described in the aforesaid Grimsley Pat. No. 3,263,851. This type squeeze tube is characterized by the aforesaid "center lock" captive closure for opening and closing the container.

Referring to FIGS. 4 and 5, the illustrative "center lock" captive closure includes a threaded cap or closure C which cooperates with corresponding threads on the complexly configured container neck N for opening and closing the cap. A retaining bead N1 prevents removal of the cap so the cap is referred to as being "captive."

The cap has a central opening in its dome for cooperating with a central imperforate plug N3 in opening and closing the container. By threading the cap outwardly, the cap opening C1 separates from the sealing plug N3 to open the container for dispensing.

The plug N3 is positioned centrally of the neck or hollow outer body N by means of transversely extending radial web members 23j. As best seen in FIG. 5, the radial web members 23j define several elongated passages 23d defined in part by arcuate outer walls 23h, and through which dispensing occurs.

In manufacture, the headpiece H may be molded as an integral unit. According to the present invention, the headpiece is integrally injection molded, including the neck or hollow outer body N and shoulder S, the central plug N3 and the radial web members 23j.

For a complete understanding of the invention, another portion of the headpiece as injection molded will now be identified and described with reference to FIG. 4. An inverted annular member N2 interconnects in bridging relation the neck (or hollow outer body) N and the plug N3. The inverted annular member N2 includes a transversely extending top wall portion 60 which lies in concentric annular relation to the central plug N3. The top wall portion 60 is connected respectively by concentric wall portions 62 and 61 to the outer body N and to the plug N3. The inverted annular member covers the elongated dispensing passages 23d as well as the radial webs 23j, and must be removed to achieve dispensing from the tube. The inverted annular member N2 is shown in broken lines in FIG. 4 after removal. The inverted annular member is injection molded simultaneously with the headpiece as described above.

The inverted annular member results from the arrangement of molding tools now to be described.

Referring now first to FIG. 1 of the drawings, there is illustrated an exemplary molding apparatus for the practice of this invention. The mold tooling here shown is the type used for molding a thermoplastic headpiece directly to a preformed tubular body to produce a collapsible squeeze tube of well-known manufacture. The general features of this tooling are known, being disclosed in such prior patents as U.S. Pat. Nos. 2,812,548 and 3,207,833, and are not a part of the present invention.

Generally, the tooling comprises a female die generally designated 10, a male tool generally designated 20 which fits within the die 10 and supports a preformed thermoplastic body sleeve B in proper position for molding, and an external sleeve member 30 which surrounds male tool 20 and moves in unison therewith to actuate internal elements of die 10 and to move the die into engagement with the nozzle 40 of a suitable injection device (not shown). Molten thermoplastic material, such as polyethylene, is injected into the cavity formed by the tooling in their closed position to form a headpiece comprising a neck element N and a shoulder portion S which is fused to the upper end of the body sleeve B. A mold of this type permits precise dimensional control of the components to be injection-formed within close tolerances, thereby minimizing subsequent finishing operations.

Die 10 comprises a die housing 11, an annular collar member 12 slidably contained within the housing and retained therein by a retaining ring 13 threadably connected to the bottom end of the die housing, and a set of segmented neck plates 14 which are spring biased and which, when cammed into closed position by lower sleeve 30 acting against collar 12, shape the outer peripheral surfaces and screw threads of the molded neck element N. Housing 11 at its upper end has a large central opening overlying neck plates 14, in which opening is fitted a special insert generally designated 15 which constitutes an important element of this invention. As will be more thoroughly described hereinafter, insert 15 is specially configured at its inner end to form the upper end surfaces of the neck element N, and has a passage 16 to provide communication from nozzle 40 into the mold cavity. The upper end of insert 15 is suitably flanged to rest on the upper wall of die housing 11 and is recessed as at 17 to receive the tip end of nozzle 40.

Male tool 20 comprises a shoulder-forming member 21 mounted on the upper end of a hollow stem or sleeve member 22, these two members together forming an elongate mandrel over which the body sleeve B is placed in a preliminary loading operation. Further details of the male tool with respect to its mounting and its relation to sleeve member 22, and the loading of the body sleeve B and bringing it with the male tool into molding position with female die 10 are unimportant to this invention, but are dealt with in considerable detail in the aforementioned U.S. Pat. 3,207,833.

An internal neck-forming member 23 is centrally disposed in the upper end of shoulder-forming member 21, and is connected to the upper end of a hollow valve stem 24 which is slidably fitted within a central bore running through member 21. The base portion 23a of member 23 is generally frusto-conical and rests within a tapered seat in the upper end of member 21, thereby providing a valve means whereby pressurized air may be admitted through hollow stem 24 to the interior of the molding from a source (not shown) connected with sleeve member 22 to loosen the molding and aid in its ejection from the male tool.

The upper portion of internal neck-forming member 23 is specially configured to form the upper and internal portions of the molded neck element N, in conjunction with neck plates 14 and the specially shaped inner end of insert 15. A central pin portion 23b projects upwardly on the axis of member 23 and is preferably tapered at its upper end. Surrounding pin 23b in concentrically spaced relation thereto are four upstanding posts 23c which, when viewed along the axis of the male tool (FIG. 2), are of arcuate shape and circumferentially spaced from one another by narrow slots 23i. The upper end of each post 23c is stepped or cut away on its interior wall, as at 23e, (FIG. 3) to provide a narrower terminal section 23f. The slots 23d connect an annular space 23g, defined between posts 23c and central pin 23b, with the outer annular cavity formed by the peripheral surface of member 23 and the inner surfaces of neck plates 14 and insert 15, as best shown in FIG. 2.

Returning now to insert 15, its inner end portion is seated within a recess 14a (FIG. 3) formed in neck plates 14 and is appropriately configured to receive the upper terminal portions of pin 23b and post sections 23f to define therewith the cavity regions for forming the upper end of neck element N. As best shown in FIG. 3, the insert is provided with a central bore extending from its inner end upwardly to passage 16, which bore includes a lower cylindrical surface 15a, an intermediate tapered surface 15b, and an upper cylindrical surface 15c of smaller diameter which terminates in a transverse wall 15d surrounding passage 16. An annular groove 15e surrounds the central bore 15a–c and is separated therefrom by a depending, annular member 15f. The outer wall of groove 15e is generally cylindrical but is enlarged at its lower end to provide the space for forming a locking bead N1 on the neck element, as best shown in FIG. 5.

Groove 15e is positioned to directly overlie post sections 23f of the male tool when the tools are closed, thereby defining an inverted, U-shaped annular space in which is shaped a single unitary annular portion N2 of the neck molding N. The significance of the formation of portion N2 will now be described in connection with the neck trimming operation.

As shown in FIG. 4, after the molding step and removal of the female die 10, the container, comprising injection-molded neck element N and shoulder S attached to body B, is loosened and lifted slightly in the male tool 20. As mentioned previously, this is accomplished by raising member 23 slightly and flowing pressurized air through valve stem 24 into the space between the molding and male tool. For simplicity of this description, the trimming step is illustrated as taking place while the container is still on the male tool but elevated to a position, in the manner just described, whereby top wall portion 60 of the annular portion N2 of the neck element is well above post sections 23f of the male tool. Alternately, however, the untrimmed container may be completely ejected from the male tool and afterward trimmed at another station.

In the disclosed embodiment, a cutter mechanism, generally designated 50, is disposed laterally of the longitudinal axis of the male tool and on a suitable mounting (not shown) which enables horizontal reciprocation of the mechanism. This mounting includes a reciprocating slide 51 supported in a suitable guide member 52. The cutter mechanism further includes a pair of knives 53, 54 mounted in parallel relation to the forward face of the slide 51. In this simplified illustration, the cutting edge of upper knife 53 projects laterally beyond the cutting edge of lower knife 54.

To accomplish the single, simple trimming step, according to the invention, slide 51 is moved to the right a predetermined distance by suitable actuating means (not shown), which movement brings the knives 53, 54 into cutting contact with distinct portions of the neck element N. Preferably, the container is rotated during the cutting step to facilitate the trimming. Thus, lower knife 54 cuts through the annular member N2 and stops short of the peripheral wall of the center plug portion N3 of the neck element. Simultaneously, upper knife 53 moves across the top of central plug portion N3 and severs the sprue N4 which is that waste portion of the molding formed in the passage 16 of insert 15.

As best illustrated in FIG. 4, the inverted annular portion N2 of the neck N comprises as mentioned a transverse top wall portion 60 having inner and outer depending concentric wall portions 61 and 62 which are molded integral at their lower ends, respectively, to the outer body or neck N and to the plug N3. The entire top wall 60 of member N2 is severed in a plane passing perpendicularly to the axis of the molded headpiece. Specifically, the inverted annular member N2 is severed through its concentric wall portions 61 and 62 substantially below its top wall 60, and well above the bottom of webs 23j. In this manner, the elongated apertures or passages 23d surrounding the plug N3 are opened. It is to be understood further that as part of the integral molding process, the transverse webs are also connected at their upper ends to the inverted annular member. When the inverted annular member is severed, its integral connection with each transverse web is also severed.

As clearly severed, the portions N2 and N4 are shown in phantom to the right side of the view of FIG. 4, illustrating the displacement of these waste portions in the trimming operation to a position for disposal. In this manner, dispensing apertures of precise and predetermined tolerances are opened in the neck element surrounding the central plug N3, and a neat and accurate cut is insured at both the plane of the dispensing aperture and the top end of the plug portion, as best shown in FIG. 5, resulting in a finished neck element of improved overall quality and appearance. This finished neck element received a cap element C, shown in phantom in FIG. 5.

It will be apparent to those skilled in the molding art that the present invention uniquely enables the fabrication of a rather difficult molding without "matched" tooling, the standard procedure used heretofore in molding neck elements of this type. That is, it has been conventional practice to mold the neck element with open dispensing apertures which required metal-to-metal contact between the aperture forming sections of the male tool and the corresponding faces of the female tool, a practice which, because of dimensional variations and normal wear, necessitated careful selection and matching of the tools to ensure properly formed apertures. This problem is eliminated by the present invention because the carefully dimensioned apertures are opened after the molding step in a simple and effective manner which ensures improved uniformity and quality in the finished product.

It will be further understood that the trimming step here illustrated and the mechanism for performing it are primarily illustrative, and that this step may be performed at other stations in the manufacturing operation· e.g. immediately following the molding station, with the container either still on the male tool or, alternately, placed on a rotation mandrel or in a chuck suitable for presenting the neck element N to the cutter mechanism 50. Also, the molding tools which are here illustrated for molding a neck element having a particular external configuration and four apertures may be altered, as desired, to form a greater or lesser number of apertures and a different external configuration of the neck element.

It is thought that the invention and many of its attendant advantages will be understood from the foregoing description and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment.

What is claimed is:

1. In a method of fabricating a molded dispensing container neck element characterized by having a central imperforate plug suspended on radial webs within a hollow outer body with the spaces between said webs defining elongated dispensing passages surrounding said plug, the steps of:

injection molding the said plug, body and webs as an integral unit in an injection mold cavity thereby to achieve precise dimensional tolerance thereof, simultaneously injection molding an inverted annular member bridging the space between said plug and body, including a transverse top wall portion thereof surrounding said plug in spaced relation thereto, spacing said top wall portion a slight distance from said mold, thereafter entirely removing said annular top wall portion from surrounding relation to said plug by severing said annular member in an annular plane disposed perpendicularly to the axis of said neck element and located above the bottoms of said webs, thereby to open said elongated dispensing passages between said webs, and, severing the outer end of said plug at a point axially spaced from said top wall portion.

2. The method of claim 1 including the step of forming said annular member with outer and inner concentric walls connected at their lower ends, respectively, to said body and said plug, and, wherein said step of severing passes through said inner wall approximately intermediate the height thereof.

3. The method of claim 1 wherein said last-named severing step occurs simultaneously with the severing of said annular member.

4. The method of claim 1 wherein said first-named severing step is effected by relatively rotating said neck element and a severing tool about said axis thereby causing said removal to occur in an annular path.

5. A method of fabricating a dispensing container neck comprising the steps of:

integrally forming a hollow neck outer body, a central imperforate plug spaced radially inwardly thereof having a short radial flange, a plurality of radial webs extending between said body and said plug, and an inverted annular member extending between the upper end of said outer body and said plug radial flange, thereby to define a substantially circular top wall of generally inverted U-shaped cross section surrounding said plug in spaced relation thereto, effecting said forming step by injection molding, thereby to insure precise dimensional tolerances between said plug, webs, and body, spacing said top wall a slight distance from the injection mold, thereafter entirely removing said top wall from surrounding relation to said plug while retaining said plug on said neck by severing said annular member above the bottoms of said webs in a plane disposed perpendicularly to the axis of said neck element, thereby to establish dispensing passages through said neck bounded by said body, plug, and webs, and, severing the outer end of said plug at a point axially spaced from said top wall portion.

6. The method of claim 5 wherein said first-named severing step is effected by relatively rotating said neck element and a severing tool about said axis thereby causing said removal to occur in an annular path.

References Cited

UNITED STATES PATENTS

| | | | |
|---|---|---|---|
| 3,207,833 | 9/1965 | D'errico | 264—334 |
| 3,317,961 | 5/1967 | Drevalas et al. | 264—163 X |
| 412,398 | 10/1889 | Lincoln | 264—154 |
| 2,286,117 | 6/1942 | Sidnell | 264—154 |
| 2,631,333 | 3/1953 | Brown | 264—154 |
| 2,896,840 | 7/1959 | Hendry | 264—154 X |
| 2,921,343 | 1/1960 | Mumford | 264—156 |
| 3,084,396 | 4/1963 | Abt | 246—154 X |
| 3,263,009 | 7/1966 | Vidal | 264—154 X |

FOREIGN PATENTS

| | | | |
|---|---|---|---|
| 1,045,799 | 12/1953 | France | 264—154 |

ROBERT F. WHITE, Primary Examiner

A. M. SOKAL, Assistant Examiner

U.S. Cl. X.R.

264—163, 328, Dig 41